C. D. HIBBS.
MOLD FOR MAKING FAN BELTS.
APPLICATION FILED JUNE 2, 1919. RENEWED MAY 28, 1921.
1,401,255.
Patented Dec. 27, 1921.
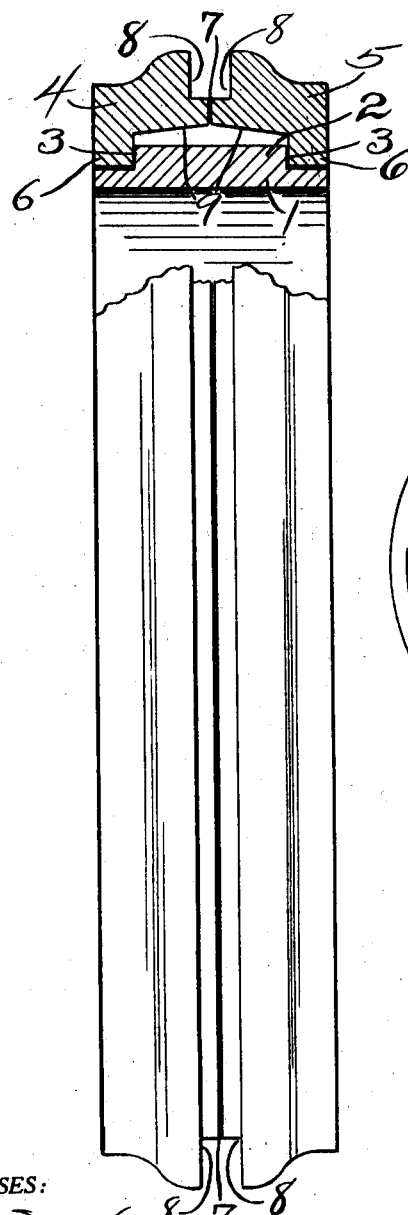
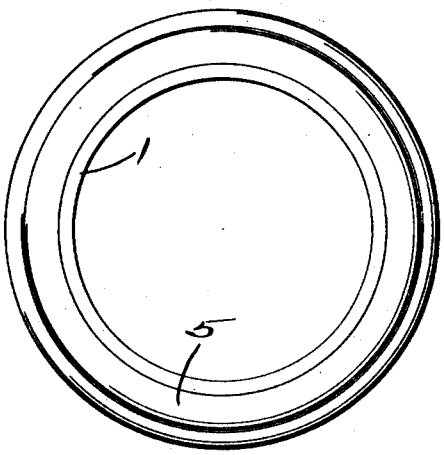
WITNESSES:
J. E. Melton
INVENTOR.
C.D. HIBBS.
BY A. D. Jackson
ATTORNEYS.

UNITED STATES PATENT OFFICE.

CASSELL D. HIBBS, OF FORT WORTH, TEXAS.

MOLD FOR MAKING FAN-BELTS.

1,401,255.        Specification of Letters Patent.      Patented Dec. 27, 1921.

Application filed June 2, 1919, Serial No. 301,150. Renewed May 28, 1921. Serial No. 473,321.

*To all whom it may concern:*

Be it known that I, CASSELL D. HIBBS, a citizen of the United States of America, residing at Forth Worth, in the county of Tarrant and State of Texas, have invented certain new and useful Improvements in Molds for Making Fan-Belts, of which the following is a specification.

My invention relates to molds for making fan belts, and the object is to provide simple devices by which belts may be made in a single integral piece of rubber or composition material, and particularly to make fan belts for motor vehicles. One advantage is that a mold in three pieces is provided which can be easily assembled and operated and which will be highly efficient in making fan belts. Other objects and advantages will be fully explained in the following description and the invention will be more particularly pointed out in the claim.

Reference is had to the accompanying drawings which form a part of this application.

Figure 1 is a side elevation of the molds assembled. Fig. 2 is an edge view, partly in section.

The improved molding devices includes a central circular body member 1, having on its periphery a relatively wide rib 2, forming abutments 3 for spacing the lateral members 4 and 5. The central body member 1 forms the base for making the belt in one piece. The members 4 and 5 have flanges 6 which engage the abutments 3. The members 4 and 5 should be equal in width and should meet along the line 7. The members 4 and 5 are cut-out in their peripheries at 8 to form a space so that some instrument may be inserted to force the parts 4 and 5 apart to remove the formed belt. The interior surfaces 9 are inclined so that the belt will be thicker intermediate its edges. The object is to make strong belts. The material for making the belts is placed between the body member and the separable members 4 and 5. The members 4 and 5 are held in place by the flanges 6 and the abutments 3. The parts are assembled with the belt material therein and any suitable wire or bolt or other device may be used to hold the parts together while being transported to a baking or curing oven. When the molds have remained the required length of time in the oven or press, they are removed and separated so that the belt may be removed. It is apparent that the molds may be used for making other circular articles.

What I claim, is,—

Molds for making belts comprising a ring body member having abutments in the sides of its periphery and separable coöperating members supported thereon having flanges engaging said abutments and spacing the separable members from the said body and forming a cavity for a belt and having cut-outs in the peripheries thereof in their meeting faces to form an annular recess for a separating instrument.

In testimony whereof, I set my hand, this 28th day of May, A. D., 1919.

CASSELL D. HIBBS.